United States Patent
Yu et al.

(10) Patent No.: US 11,448,171 B1
(45) Date of Patent: Sep. 20, 2022

(54) HOT-CHARGE DUCT FOR TURBOCHARGER SYSTEM

(71) Applicant: FORD GLOBAL TECHNOLOGIES, LLC, Dearborn, MI (US)

(72) Inventors: Baolin Yu, Ypsilanti, MI (US); Abdul Sami Siddiqui, Canton, MI (US); Mohammad Ali Moetakef, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/358,524

(22) Filed: Jun. 25, 2021

(51) Int. Cl.
*F02M 35/10* (2006.01)

(52) U.S. Cl.
CPC . *F02M 35/10124* (2013.01); *F02M 35/10157* (2013.01)

(58) Field of Classification Search
CPC ........ F02M 35/10091; F02M 35/10124; F16L 9/006
USPC ................................... 138/DIG. 11
See application file for complete search history.

(56) References Cited

U.S. PATENT DOCUMENTS

| | | | | |
|---|---|---|---|---|
| 4,248,179 A * | 2/1981 | Bonner | ...................... | F28F 1/40 165/184 |
| 4,729,409 A * | 3/1988 | Paul | ...................... | H02G 3/0487 174/95 |
| 9,222,447 B2 | 12/2015 | Yamada et al. | | |
| 2011/0099959 A1* | 5/2011 | Moser | ................... | B01D 46/521 427/244 |
| 2012/0132310 A1* | 5/2012 | Cavaliere | .............. | B29C 70/086 138/145 |
| 2018/0320801 A1* | 11/2018 | Yang | ....................... | F16L 9/006 |
| 2019/0323460 A1* | 10/2019 | Flores Corona | ............................ | F02M 35/10118 |

FOREIGN PATENT DOCUMENTS

| | | | | |
|---|---|---|---|---|
| DE | 9305104 U1 * | 7/1993 | | |
| DE | 9405221 U1 * | 8/1994 | | |
| DE | 10251501 A1 | 5/2004 | | |
| DE | 102019112213 A1 * | 11/2020 | | |
| EP | 0427542 A2 | 5/1991 | | |
| EP | 1091105 A1 * | 4/2001 | .......... | F02B 27/0215 |
| FR | 2073259 A1 * | 12/1969 | | |
| IT | TO930060 A1 * | 8/1994 | | |
| JP | 5228127 B1 * | 7/2013 | ............... | E03B 7/12 |
| KR | 20020009402 A * | 2/2002 | | |

* cited by examiner

*Primary Examiner* — Ngoc T Nguyen
(74) *Attorney, Agent, or Firm* — Vincent Mastrogiacomo; Brooks Kushman P.C.

(57) ABSTRACT

A turbocharger system includes a compressor, an intercooler, and a hot-charge duct connecting an outlet of the compressor to an inlet of the intercooler. The hot-charge duct has a first end portion connected to the inlet, a second end portion connected to the outlet, and a central tubular portion extending from the first end portion to the second end portion. The central tubular portion is formed of a plurality of circumferentially interconnected semi-tubular sections that extend longitudinally.

20 Claims, 3 Drawing Sheets

HOT-CHARGE DUCT FOR TURBOCHARGER SYSTEM

TECHNICAL FIELD

This disclosure relates to turbocharger systems and more particularly to hot-charge ducts.

BACKGROUND

A vehicle may include an internal-combustion engine that is turbocharged to increase the power output without a substantial increase in an engine's displacement. The turbocharger has a turbine that is plumbed with an exhaust system and a compressor that is plumbed with an air intake. During operation, exhaust gases produced by the engine drive the turbine. The compressor, which is rotationally coupled to the turbine, provides boosted air, i.e., air having a pressure above atmospheric, to the intake manifold of the engine.

SUMMARY

According to one embodiment, a turbocharger system includes a compressor, an intercooler, and a hot-charge duct connecting an outlet of the compressor to an inlet of the intercooler. The hot-charge duct has a first end portion connected to the inlet, a second end portion connected to the outlet, and a central tubular portion extending from the first end portion to the second end portion. The central tubular portion is formed of a plurality of circumferentially interconnected semi-tubular sections that extend longitudinally.

According to another embodiment, a turbocharger system includes a compressor, an intercooler, and a hot-charge duct connecting an outlet of the compressor to an inlet of the intercooler. The hot-charge duct has a first end portion connected to the inlet, a second end portion connected to the outlet, and a central portion extending from the first end to the second end. The central portion has a plurality of semi-tubular exterior ribs that extend longitudinally along the central portion and are circumferentially interconnected to form an enclosed tube.

According to yet another embodiment, a hot-charge duct of a turbocharger system includes a tubular first end portion, a tubular second end portion, and a tubular central portion extending from the first end portion to the second end portion. The central tubular portion is formed of a plurality of circumferentially interconnected semi-tubular sections that extend longitudinally along a length of the central portion.

DETAILED DESCRIPTION

Figure 1:
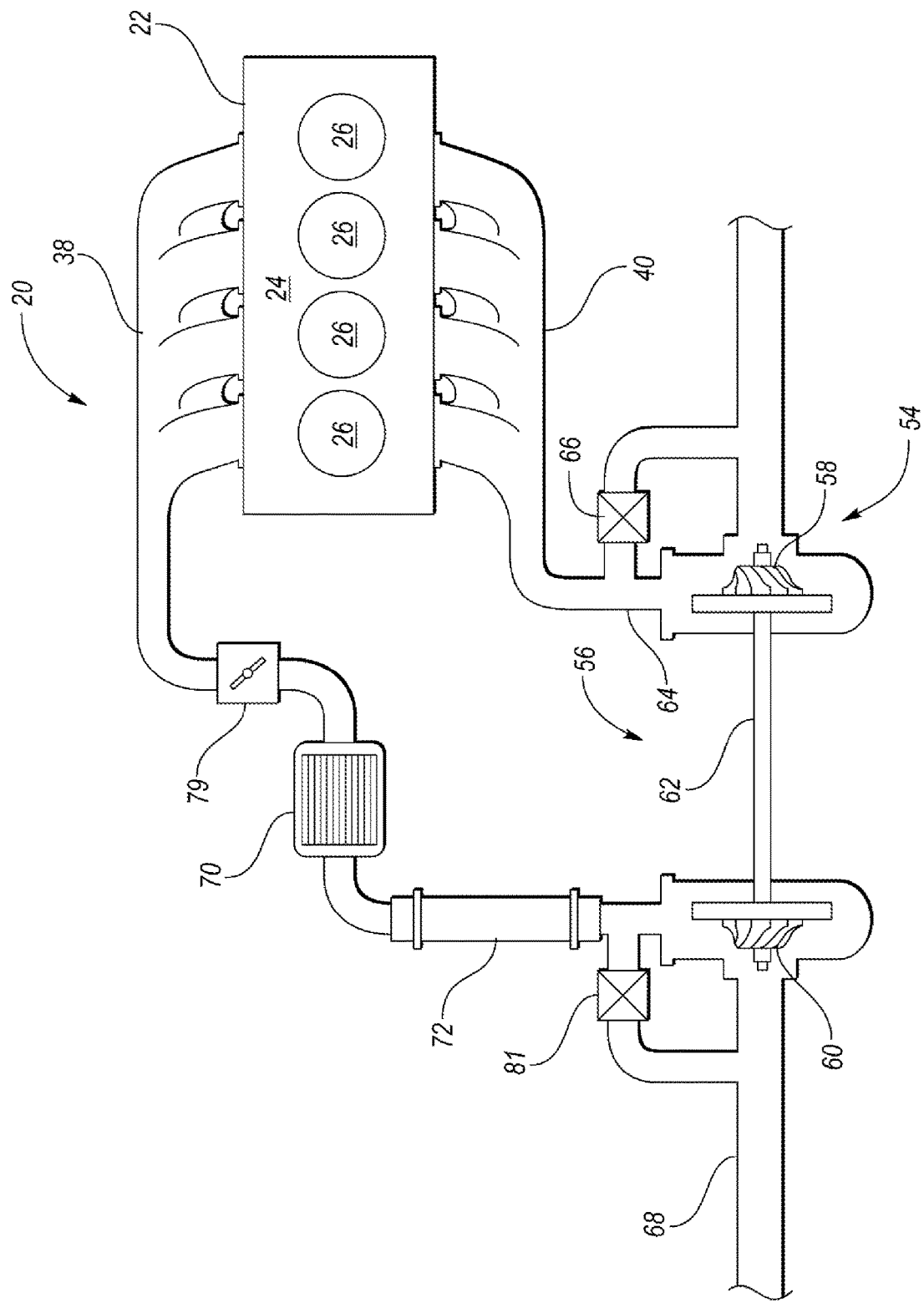
FIG. 1 is a schematic diagram of an engine system including a hot-charge duct.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis or centerline is shown in the figures and described below. Terms such as "outer" and "inner" are relative to the central axis. For example, an "outer" surface means that the surface faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 2:
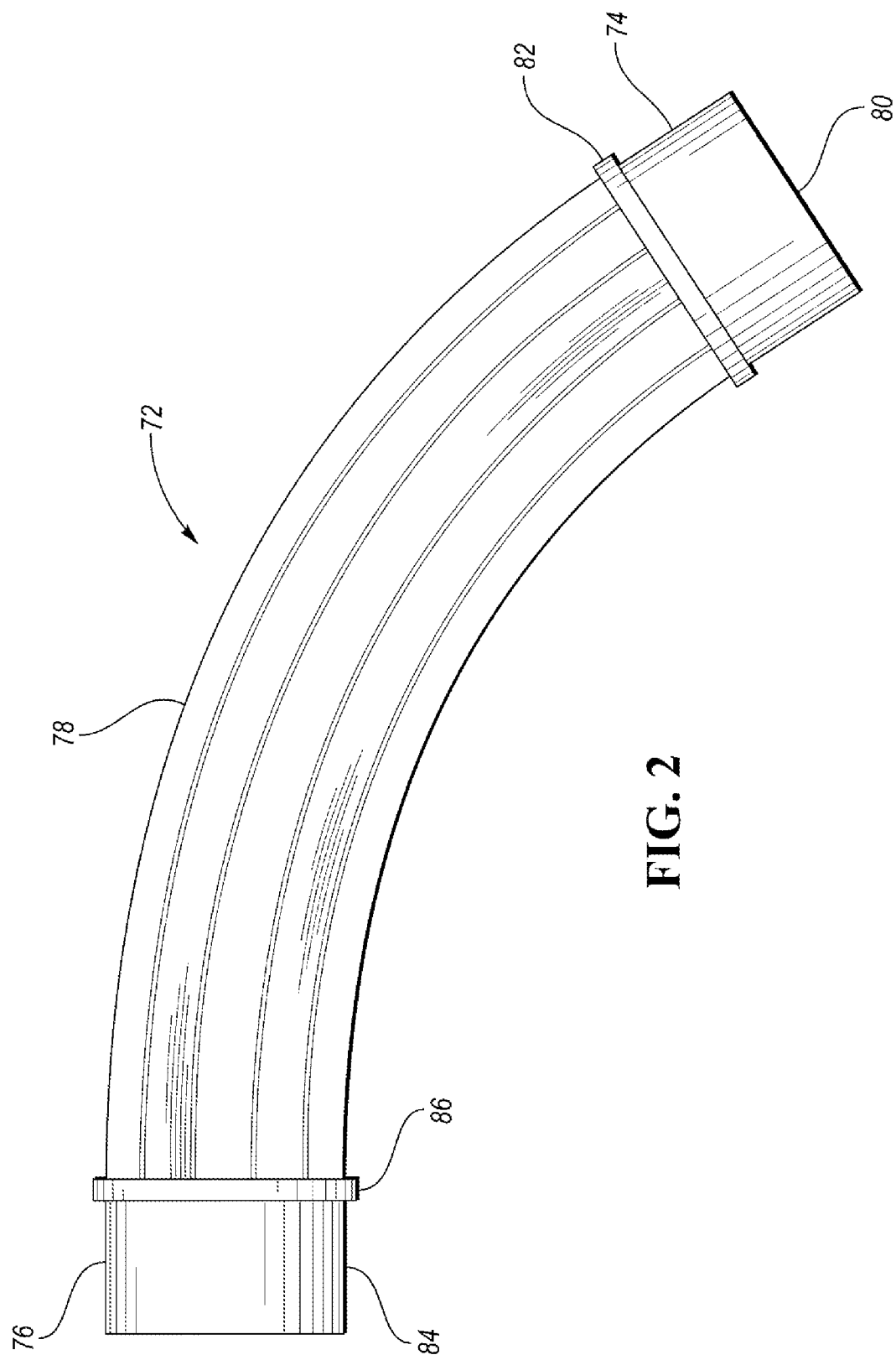
FIG. 2 is plan view of the hot-charge duct according to one or more embodiments.

Referring FIGS. 1 and 2, an engine system 20 includes an engine 22 having an engine block 24 defining a plurality of cylinders 26. The illustrated block 24 is an inline four-cylinder engine, however, this disclosure contemplates many engine configurations such as an inline six cylinder, an inline eight cylinder, a V6, a V8, or any other known configuration. Pistons are supported in the cylinders 26. Each of the pistons includes a rod that connects with a crankshaft. A cylinder head is connected on top of the block 24. The cylinder head cooperates with the block 24 to form combustion chambers. The combustion chambers receive intake air from an intake manifold 38. Similarly, exhaust combustion gases exit the combustion chambers and are transported away by one or more exhaust manifolds 40. Intake valves and exhaust valves selectively connect the combustion chambers in fluid communication with the intake and exhaust manifolds 38, 40. The intake and exhaust valves are opened and closed by one or more camshafts (not shown).

The engine system 20 is turbocharged and includes one or more turbochargers. In the illustrated embodiment, the engine system 20 includes a turbocharger system 54 having a single turbocharger 56. In other embodiments, twin turbochargers may be provided. Additionally, the turbocharger system 54 may include more than two turbochargers. The turbocharger 56 include a turbine 58 and a compressor 60. The turbine 58 is rotationally coupled to the compressor 60, such as by a shaft 62 or the like.

The turbine 58 is driven by exhaust gases and is arranged along an exhaust passage 64. A wastegate 66 may be provided to bypass the turbine 58. The compressor 60 is driven by the turbine 58. The compressor 60 includes an inlet that receives air at atmospheric pressure through an air box and associated plumbing 68. The outlet of the compressor 60 is connected in fluid communication with a heat exchanger 70, e.g., an intercooler, via a hot-charge duct 72. A compressor recirculation valve 81 may be provided to route air around the compressor 60. The valve 81 may be bidirectional allowing air to flow in the reverse direction to avoid compressor surge during a transient maneuver such as throttle tip-out. The valve 81 may also allow air to flow in the forward direction around the compressor 60 if needed. The valve 81 may include associated conduit. The valve 81 may be controlled by electric signal, vacuum, or the like. The heat exchanger 70 is connected in fluid communication with the throttle body 79 of the air intake. The throttle body 79 controls the amount of air entering into the intake manifold 38 and is typically increased or decreased based on accelerator pedal position.

The hot-charge duct 72 carries the hot, pressurized air from the compressor 60 to the intercooler 70. Traditionally, the hot-charge ducts were formed of heavy-duty metal having a relatively large mass and rigidity. The heavy-duty metal ducts provided suitable noise, vibration, and harshness (NVH), but were relatively heavy and expensive. Cost and weight savings may be achieved by constructing the hot-charge duct from a plastic or composite material. Achieving suitable NVH with plastic or composite hot-charge ducts is challenging as they are prone to exhibit unacceptable noise, e.g., whoosh, under load. Increasing the wall thickness of the plastic duct may achieve suitable NVH, but this increases package size and weight. Disclosed herein, are thin-walled plastic/composite hot-charge ducts with specific structural features and cross-sectional shapes that satisfy NVH while reducing weight and cost.

Referring to FIG. 2, the hot-charge duct 72 includes a first tubular end portion 74, a second tubular end portion 76, and a tubular central portion 78. The first end portion 74 is configured to connect with the outlet of the compressor or an intermediate component. The end portion 74 may include a smooth tubular section 80 that is configured to engage with the outlet of the compressor and a collar 82 that forms the interface between the end portion 74 and the central portion 78. The collar 82 may have a larger diameter than the end portion 74 and the central portion 78. The second end portion 76 is configured to connect with the inlet of the intercooler or an intermediate component. The second end 76 may include a smooth tubular section 84 that is configured to engage with the inlet of the intercooler and a collar 86 that forms the interface between the end portion 76 and the central portion 78. The collar 86 may have a larger diameter than the end portion 76 and the central portion 78.

Figure 3:
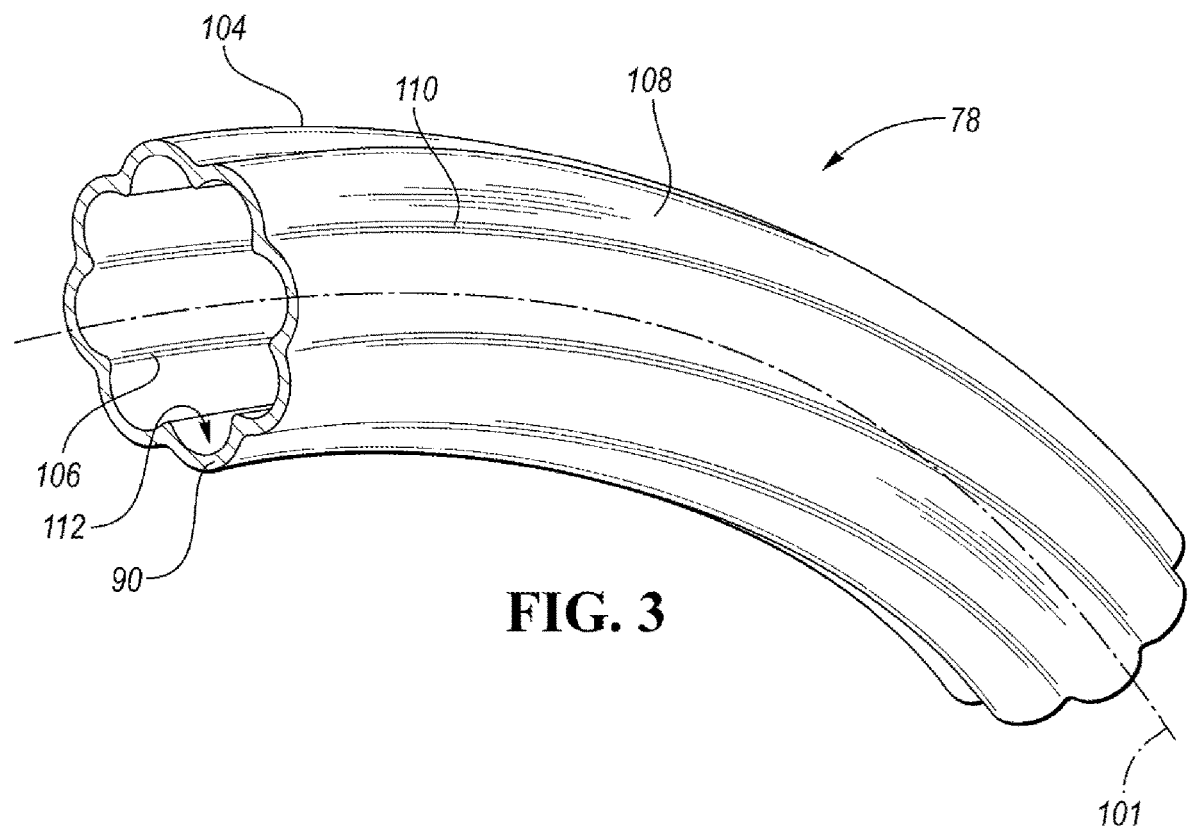
FIG. 3 is a perspective view of a central portion of the hot-charge duct.
Figure 4:
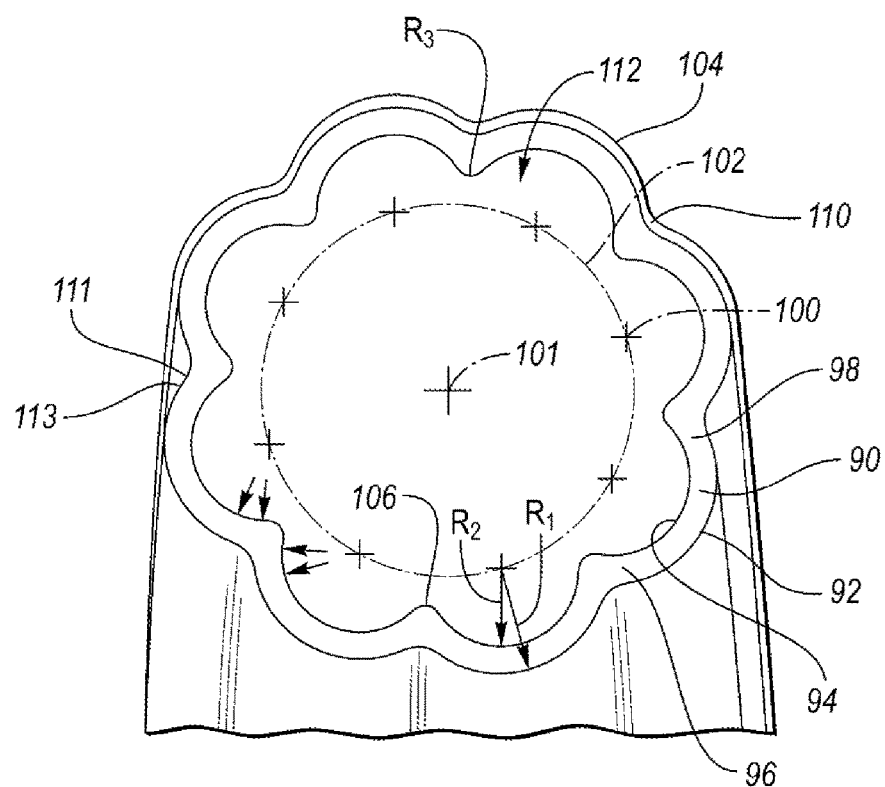
FIG. 4 is a cross-sectional view of the central portion.

Referring to FIGS. 3 and 4, the central portion 78 may be an enclosed tube having a unique cross-sectional shape. The illustrated cross-sectional shape may be referred to as a flower-shaped cross section. The central portion 78 may be formed by a plurality of circumferentially interconnected semi-tubular sections 90 that extend longitudinally along the length (longitudinal direction) of the central portion 78. The sections 90 may extend the complete length of the central portion 78, i.e., between the collars 82, 86. Each semi-tubular section 90 may be a partial circular cylinder, which in the illustrated embodiment is substantially half of the cylinder. The sections 90 may include an outer convex side 92, an inner concave side 94, and circumferentially opposing side portions 96, 98. The tubular sections 90 are arranged with their centerlines 100 substantially parallel to the centerline 101 of the duct 72. The convex side 92 is formed by a first cylindrical surface having a radius R1 from the centerline 100, and the concave side 94 is formed by a second cylindrical surface having a radius R2 from the centerline 100. R1 is larger than R2 creating a wall thickness of the central portion 78. The wall thickness may be between 2 and 6 millimeters in one or more embodiments. This, of course, is just an example. The radii of the semi-tubular sections 90 may all be the same. The centerlines 100 of the semi-tubular sections 90 may all lie on a common unit circle 102 and may be equally circumferentially spaced around the unit circle 102. The unit circle 102 is centered on the centerline 101.

The circumferential side portions 96, 98 of the tubular sections 90 are interconnected to form an enclosed tube. The convex sides 92 form exterior ribs 104 and the intersections of the tubular sections 90 form interior ribs 106 that extend longitudinally. The interior ribs 106 and the exterior ribs 104 alternate in the circumferential direction of the central portion 78. The exterior ribs 104 may be parallel to each other and to the interior ribs 106, and the interior ribs 106 may be parallel to each other. This creates a consistent spacing along the length of the central portion 78. The concaved sides 94 extend circumferentially between the interior ribs 106 and project radially outward to form pockets 112.

The exterior 108 of the central portion 78 is formed by the exterior ribs 104 and valleys 110 that interconnect adjacent exterior ribs 104. The valleys 110 may have a concave shape. The valleys 110 include circumferential side portions 111 that are joined to the circumferential side portions 113 of the exterior ribs 104. The radii R3 of the valleys 110 may be smaller than the radii R1 and R2, and the arc length of the valleys 110 may be smaller than the arc length of the convex and concaved sides. The center points of the radii R3 are external to the duct, whereas the center points of the radii R1 and R2 are internal to the duct.

The hot-charge duct 72 may be formed of plastic such as high-temperature engineering plastic. Examples include polyphenylene sulfide (PPS) and high-temperature nylons PA46, PA6 and PA66. The hot-charge duct 72 may be formed as a molded part. For example, the duct 72 may be formed of two injection molded parts that are separately formed and later joined together to form the finished product.

The exterior and interior ribs of the flower-shaped hot charge duct increase stiffness of the central portion and reduce surface velocity under excitation. Testing has shown that the longitudinal ribs of this disclosure may be more effective than transverse ribs at reducing noise associated with plastic hot-charge ducts. Another factor contributing to airborne noise is the air excitation applied on the inner wall of duct. Since the air is almost uniformly distributed along the inner wall, the pressure on two concaved sides will reduce or cancel each other out, as shown by the arrows in FIG. 4. This results in a reduction of the overall excitations applied on the inner wall. Therefore, the surface velocity is reduced throughout the entire frequency range and the airborne noise level is reduced.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbocharger system comprising:
   a compressor;
   an intercooler; and
   a hot-charge duct connecting an outlet of the compressor to an inlet of the intercooler, the hot-charge duct including:
   a first end portion connected to the inlet;
   a second end portion connected to the outlet, and
   a central tubular portion extending from the first end portion to the second end portion, the central tubular portion being formed of a plurality of circumferentially interconnected semi-tubular sections that extend longitudinally.

2. The turbocharger system of claim 1, wherein the semi-tubular sections have convex sides that form exterior ribs of the central tubular portion and wherein intersections of the semi-tubular sections form interior ribs of the central tubular portion.

3. The turbocharger system of claim 2, wherein the semi-tubular sections have concaved sides that extend circumferentially between the interior ribs.

4. The turbocharger system of claim 1, wherein radii of the semi-tubular sections are all the same.

5. The turbocharger system of claim 1, wherein each of the semi-tubular sections has a center point, and the center points all lie on a common circle.

6. The turbocharger system of claim 1, wherein an outer surface of the central tubular portion includes convex exterior ribs formed by the semi-tubular sections and concaved valleys extending circumferentially between the exterior ribs.

7. The turbocharger system of claim 6, wherein each of the exterior ribs has a first circumferential side connected to one of the valleys and a second circumferential side connected to another of the valleys.

8. The turbocharger system of claim 7, wherein each of the valleys has a first circumferential side connected to one of the exterior ribs and a second circumferential side connected to another of the exterior ribs.

9. The turbocharger system of claim 1, wherein the semi-tubular sections extend along an entire length of the central tubular portion.

10. The turbocharger system of claim 1, wherein the hot-charge duct is formed of plastic.

11. A turbocharger system comprising:
    a compressor;
    an intercooler; and
    a hot-charge duct connecting an outlet of the compressor to an inlet of the intercooler, the hot-charge duct including:
    a first end portion connected to the inlet,
    a second end portion connected to the outlet, and
    a central portion extending from the first end to the second end, the central portion having a plurality of semi-tubular exterior ribs that extend longitudinally along the central portion and are circumferentially interconnected to form an enclosed tube.

12. The turbocharger system of claim 11, wherein the exterior ribs extend along an entire length of the central portion.

13. The turbocharger system of claim 11, wherein circumferential spacing between the exterior ribs is constant along a length of the central portion.

14. The turbocharger system of claim 11, wherein the central portion further has a plurality of circumferentially spaced interior ribs that extend longitudinally along the central portion.

15. The turbocharger system of claim 14, wherein the interior and exterior ribs circumferentially alternate around the central portion.

16. The turbocharger system of claim 11, wherein each of the exterior ribs has a convex side forming a portion of an exterior of the central portion and a concave side forming a portion of an interior of the central portion.

17. A hot-charge duct of a turbocharger system comprising:
    a tubular first end portion;
    a tubular second end portion; and
    a tubular central portion extending from the first end portion to the second end portion, the tubular central portion being formed of a plurality of circumferentially interconnected semi-tubular sections that extend longitudinally along a length of the tubular central portion.

18. The hot-charge duct of claim 17, wherein the first and second end portions include first and second collars, and wherein the semi-tubular sections extend from the first collar to the second collar.

19. The hot-charge duct of claim 17, wherein the semi-tubular sections have convex sides that form exterior ribs of the tubular central portion and wherein intersections of the semi-tubular sections form interior ribs of the tubular central portion.

20. The turbocharger system of claim 17, wherein an outer surface of the tubular central portion includes convex exterior ribs formed by the semi-tubular sections and concaved valleys extending between the exterior ribs, and wherein each of the exterior ribs has a first circumferential side connected to one of the valleys and a second circumferential side connected to another of the valleys.

* * * * *